WILLIAM H. BATES & HUGH FAULKNER.

Improvement in Covering Tubular Fabrics with Rubber.

No. 127,733. Patented June 11, 1872.

UNITED STATES PATENT OFFICE.

WILLIAM H. BATES AND HUGH FAULKNER, OF LEICESTER, ENGLAND, ASSIGNORS TO EZRA THOMAS SAWYER, OF EAST HAMPTON, MASS.

IMPROVEMENT IN COVERING TUBULAR FABRICS WITH RUBBER.

Specification forming part of Letters Patent No. 127,733, dated June 11, 1872.

Specification describing a new and Improved Machine for Covering Tubular Fabrics with Rubber, invented by WILLIAM HENRY BATES and HUGH FAULKNER, of Leicester, England.

Figure 1:
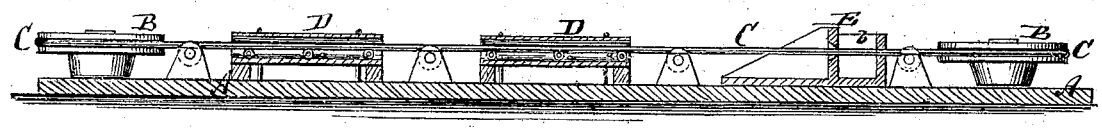
Figure 2:
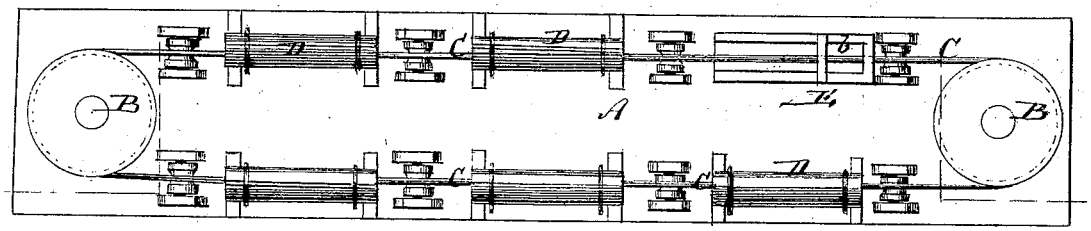
Figure 3:
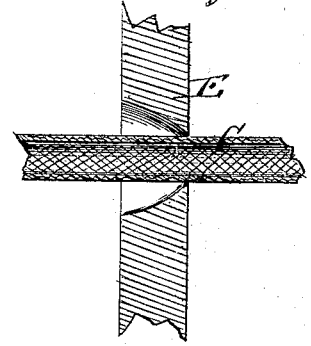

Figure 1 represents a vertical longitudinal section of our improved machine for covering tubular fabrics. Fig. 2 is a plan or top view of the same. Fig. 3 is a detail sectional view of the annular scraper.

Similar letters of reference indicate corresponding parts.

This invention relates to a new machine for applying an outside coating of India rubber, gutta-percha, or other analogous elastic gum to tubular fabrics that are to be made water-tight. It is more particularly adapted to, and intended for, the manufacture of rubber hose; but may also be used for other tubular fabrics. The invention consists of the new arrangement of two drums, a series of drying-cylinders, and an annular scraper, whereby the tubular fabric connected into an endless band, can be continuously revolved, covered, scraped, and dried, as hereinafter more fully described.

A, in the drawing, represents the supporting plate or base of the machine. B B are two drums or pulleys hung to spindles $a\ a$ that are secured to or have their bearings in the base. The tube C to be covered is with a core within it so as to be properly swelled, placed around the two drums, as shown, and has its ends connected. It is thus an endless tube, which can be revolved whenever rotary motion is imparted to one of the drums. D D are a series of open-ended metallic cylinders secured upon the base A in such manner and position that the endless tube C, placed around the drums, will pass through these cylinders, as is clearly indicated in Fig. 2. The cylinders can be heated by gas, steam, hot water, or other means, and may contain little friction-rollers $a\ a$ on which the tube C rests, as shown in Fig. 1. E is a plate placed across the base in the way of the tube C, and perforated to let the tube pass through it. The circular tube through E has tapering edges, as shown, so that it is smallest on that side from which the tube moves toward it. An attendant can lay on the rubber solution with a brush, spatula, or other instrument; or the solution may be contained in a box, $b$, through which the hose passes before reaching the gauge or scraper E. The forward edge of the scraper will fit tight round the covered hose to scrape off any superfluous covering; but embed firmly in the meshes of the fabric, and consolidate what remains. The tube thus covered will be without seam throughout its length. The machine can be continued in operation for a suitable length of time until the covering has acquired the requisite thickness and firmness. While passing through the heated cylinders D D the volatile solvent of the applied solution is evaporated and the covered tube dried, to be ready for the vulcanizing process.

The process herein described is applicable to tubing made of suitable woven or braided fabric, or of leather or other material.

Having thus described our invention, we claim as new, and desire to secure by Letters Patent—

1. The machine for covering tubular fabrics, consisting of the drums B B, cylinders D D, and gauge E, all arranged as described.

2. The method herein described, of covering tubular fabrics by forming the same into endless bands and then drawing them in continuous motion through the covering material, gauge, or scraper, and heating-vessels, as specified.

The above specification of our invention signed by us this 13th day of December, 1871.

WILLIAM HENRY BATES.
HUGH FAULKNER.

Witnesses:
ALFRED BROMWICK,
STEPHEN PRAKE.